United States Patent
Peng et al.

(10) Patent No.: US 8,179,478 B2
(45) Date of Patent: May 15, 2012

(54) SYSTEM FOR ADJUSTING COLOR IMAGE QUALITY AND METHOD THEREOF

(75) Inventors: Cheng-Chung Peng, Hsinchu (TW); Yuhren Shen, Cyonglin Township, Hsinchu County (TW)

(73) Assignee: Vastview Technology, Inc., Hsin-Chu Hsien (TW)

( * ) Notice: Subject to any disclaimer, the term of this patent is extended or adjusted under 35 U.S.C. 154(b) by 1161 days.

(21) Appl. No.: 12/007,489

(22) Filed: Jan. 11, 2008

(65) Prior Publication Data
US 2009/0180029 A1 Jul. 16, 2009

(51) Int. Cl.
*H04N 5/46* (2006.01)

(52) U.S. Cl. ........ 348/557; 348/638; 348/649; 348/453; 348/659; 348/642; 345/603

(58) Field of Classification Search .......................... None
See application file for complete search history.

(56) References Cited

U.S. PATENT DOCUMENTS

| | | | |
|---|---|---|---|
| 2004/0036704 A1* | 2/2004 | Han et al. | 345/690 |
| 2005/0030422 A1* | 2/2005 | Leone et al. | 348/441 |
| 2005/0270426 A1* | 12/2005 | Wu et al. | 348/638 |
| 2007/0126933 A1* | 6/2007 | Ting | 348/649 |
| 2008/0013135 A1* | 1/2008 | Hsu et al. | 358/520 |
| 2008/0044101 A1* | 2/2008 | Huang et al. | 382/274 |

* cited by examiner

*Primary Examiner* — Dominic D Saltarelli
*Assistant Examiner* — Jason J Chung
(74) *Attorney, Agent, or Firm* — Rosenberg, Klein & Lee

(57) ABSTRACT

A system for adjusting color image quality includes converting color video signal sources into component video signals including a luminance signal and chrominance signals. A signal axis rotation circuit performs coordination transformation on the chrominance signals in accordance with a hue calibration parameter; and a multiplier multiplies the coordinate-transformed chrominance signals with a chroma calibration parameter to obtain output chrominance signals. The output chrominance signals and the luminance signal together form a component chrominance signal, which is applied to and output by a chrominance signal inverse conversion unit.

12 Claims, 18 Drawing Sheets

SYSTEM FOR ADJUSTING COLOR IMAGE QUALITY AND METHOD THEREOF

FIELD OF THE INVENTION

The present invention relates to color image processing, and in particular to a system for adjusting color image quality and a method thereof.

BACKGROUND OF THE INVENTION

With the quick development of video technology, more and more formats of video interface are available. The most commonly used formats for color video signal include composite video signal, S-video signal, VGA-terminal RGB, and component video signal.

The color that a color image presents is one of the major factors for display of image data. Color has essentially three attributes: hue, brightness, and saturation. Hue represents the difference between color systems. Brightness indicates the level of lightness of color. Saturation indicates the purity of color and is also referred to as chroma. A color video signal is made up of R, G, B signals, respectively indicating the three, primary colors. In the transmission of a huge amount of data of color signals, encoding/decoding technologies will be employed to enhance processing of the image signals.

The most commonly known color difference video terminal that is adapted in currently video/audio designs separates the video signal into three different component signals for transmission of signal. These three component signals are respectively a brightness or luminance signal Y and two chrominance signals Pb, Pr, which are blue-color signal and red-color signal retrieved from the three primary-color signals.

SUMMARY OF THE INVENTION

Various technologies have been adapted to process image signals. An example is Taiwan Patent Publication No. 200726272, which discloses a method and a device for adjusting color of a display device, wherein color video signal sources R, G, B from an image signal source is converted into the Y-U-V image signal format by a color conversion circuit, followed by further conversion of the Y-U-V image signal into a Y-C-H image signal format with a hue conversion circuit. These, together with a hue difference look-up table and a saturation matching look-up table, inverse hue conversion, inverse color conversion, provides an output image signal. The processing of the color signal disclosed in the known technology requires complicated hardware circuit for color space conversion.

US Patent Publication No. 20040021671 A1 discloses a color space conversion circuit for processing image signals for adjustments of saturation, luminance, and hue. This reference provides complete adjustment for quality of color image, but the circuit disclosed thereby is essentially built up on hardware, leading to very complicated circuit design.

US Patent Publication No. 20070086030 A1 discloses a conversion circuit for color image signal and a method thereof. This reference uses a processing circuit that requires complicated matrix operation and the number of regions on which adjustment can be independently carried out is subjected to limitation. Further, all-region calibration that combines adjustments for luminance, saturation, and hue is generally not possible.

Another example is disclosed in U.S. Pat. No. 6,552,751, which teaches a video signal processing circuit used to adjust brightness, contrast, and hue of a color video signal. An input video signal is first converted by a first matrix circuit into luminance and chrominance signals, followed by processing carried out by signal processing circuit and then converted back to image signals by a second matrix circuit. This reference uses complicated matrix operation and conversion.

A further example is shown in U.S. Pat. No. 4,679,072, which discloses an image signal adjusting device, wherein adjustment is realized by rotation of coordinate axes. Although the reference uses simple circuit architecture, the adjustment of color signal quality can be done thereby is very limited, making it not fit for the practical needs for modern video facility.

Apparently, theses conventional technologies discussed above have certain drawbacks, including requiring complicated conversion of color space, being impossible to realize independent color and gamut conversion, requiring complication mathematic operation, requiring a large memory space for storing look-up table, and requiring additional complicated circuit to combine all-region calibration and individual region calibration.

Thus, an objective of the present invention is to provide a color image quality adjusting system and a method thereof, wherein color video signal sources are converted into component video signals including an output luminance signal and output chrominance signals.

Another objective of the present invention is to provide a color image quality adjusting system and a method thereof, wherein individual color and gamut conversion can be realized without complicated color space conversion.

To achieve the above objectives, the present invention provide a solution, wherein color video signal sources R, G, B are converted by a color signal conversion unit into component video signals including a luminance signal and chrominance signals and the component video signals are further processed by a hue and chroma conversion and adjustment unit to carry out coordination transformation on the chrominance signals in accordance with a hue calibration parameter, followed by signal multiplication carried out by a multiplier in accordance with a chroma calibration parameter to thereby generate output chrominance signals.

In a preferred embodiment of the present invention, the hue calibration parameter and the chroma calibration parameter are generated by a calibration parameter generation unit on the basis of a mapping type hue and chroma look-up table.

In a preferred embodiment of the present invention, a luminance conversion and adjustment unit is further included, which receives the chrominance signals generated by the color signal conversion unit and addition operation is carried out on the received chrominance signals with a luminance calibration parameter by an adder to generate an output luminance signal. The luminance conversion and adjustment unit further comprises an image contrast adjustment unit, which carries out adjustment of contrast on the output luminance signal provided by the luminance conversion and adjustment unit to generate the output luminance signal.

As compared to the conventional color image processing technologies, the present invention realizes independent color and gamut conversion without employment of complicated color space conversion. The present invention employs superimposition of plural mask look-up tables to generate a new mapping loop-up table and thus requires no complicated mathematic operations and reduces the amount of memory space needed for storage of look-up tables. Further, the present invention integrates or combines all-region and individual-region independent calibrations without using additional circuits and also achieves individual region calibration with respect to luminance, chroma, and hue.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
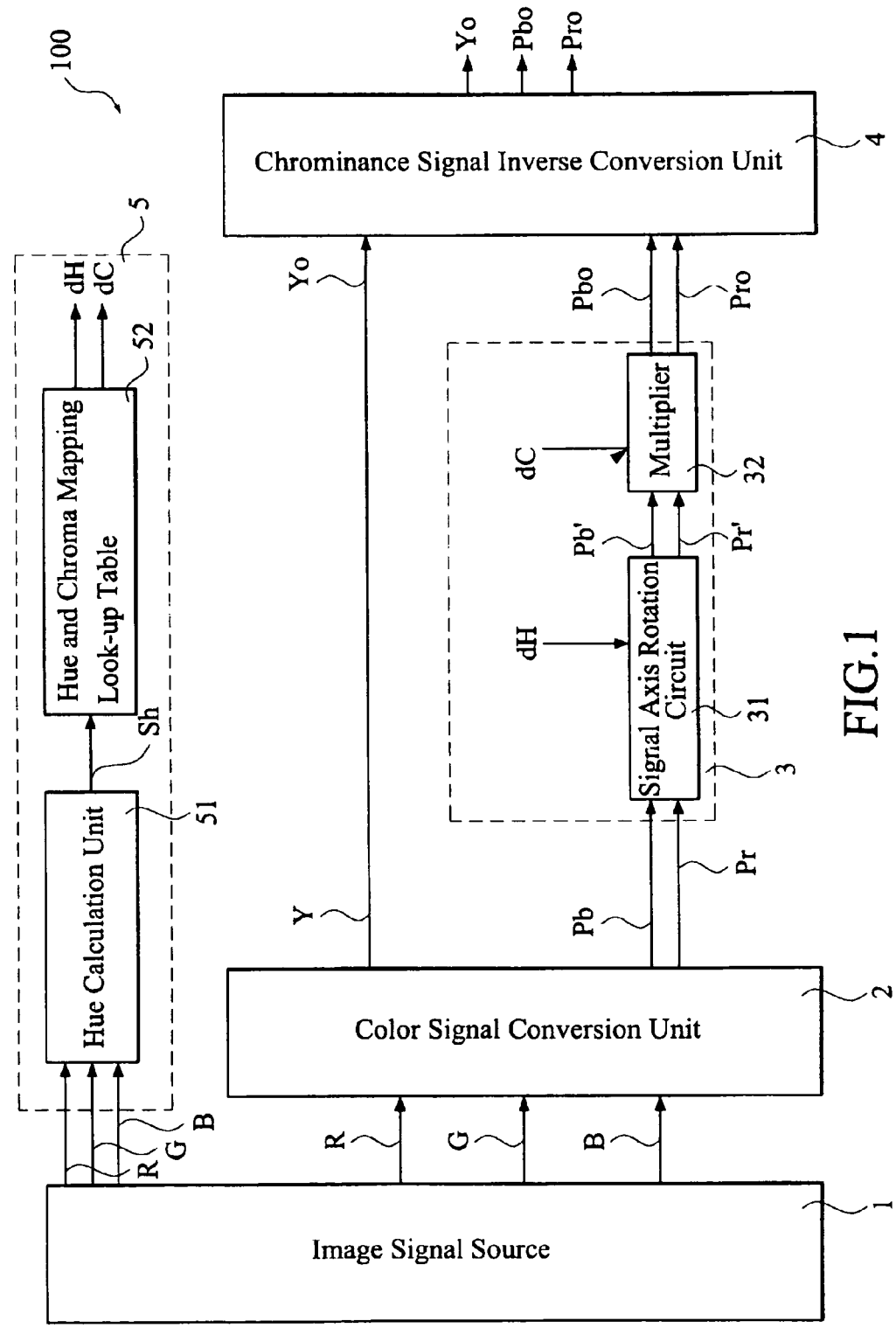
FIG. 1 shows a schematic system diagram for adjusting color image quality in accordance with a first embodiment of the present invention.

With reference to the drawings and in particular to FIG. 1, which shows a schematic system diagram for adjusting color image quality in accordance with a first embodiment of the present invention, the color image quality adjusting system of the present invention, generally designated with reference numeral 100, comprises a color signal conversion unit 2, a hue and chroma conversion and adjustment unit 3, and a chrominance signal inverse conversion unit 4, and a calibration parameter generation unit 5. The hue and chroma conversion and adjustment unit 3 comprises a signal axis rotation circuit 31 and a multiplier 32.

Color video signal sources R, G, B supplied from an image signal source 1 are first processed by the color signal conversion unit 2 for converting into component video signals Y, Pb, Pr that consist a luminance signal Y and two chrominance signals Pb, Pr. The chrominance signals Pb, Pr are fed to the hue and chroma conversion and adjustment unit 3 to subject the chrominance signals Pb, Pr to coordinate transformation in accordance with a hue calibration parameter dH generated by the calibration parameter generation unit 5 and are further subjected to multiplication with a chroma calibration parameter dC generated by the calibration parameter generation unit 5 in the multiplier 32 to thereby provide output chrominance signals Pbo, Pro.

The coordination transformation performed by the signal axis rotation circuit 31 is to carry out signal coordination transformation on the chrominance signals Pb, Pr with the following formulas based on the hue calibration parameter dH provided by the calibration parameter generation unit 5:

$$Pb'=(Pb \times \text{Cos}(dH\_\theta) - Pr \times \text{Sin}(dH\_\theta))$$

$$Pr'=(Pr \times \text{Cos}(dH\_\theta) + Pb \times \text{Sin}(dH\_\theta))$$

wherein Pb', Pr' are transformed chrominance signals, Pb, Pr are the originally input chrominance signals and $dH\_\theta$ indicates the angle ($\theta$) of the hue calibration parameter dH on the PbPr coordinate plane. The original chrominance signals Pb, Pr, after having subjected to coordinate transformation in accordance with the previously transformation formulas carried out by the signal axis rotation circuit 31, are converted into coordinate-transformed chrominance signals Pb', Pr'. The transformed chrominance signals Pb', Pr' are then fed to the multiplier 32 to multiple with the chroma calibration parameter dC provided by the calibration parameter generation unit 5 in order to obtain the output chrominance signals Pbo, Pro. The output chrominance signals Pbo, Pro are then applied to the chrominance signal inverse conversion unit 4.

Simultaneous with the output chrominance signals Pbo, Pro, the luminance signal Y supplied from the color signal conversion unit 2 is also fed to the chrominance signal inverse conversion unit 4 as an output luminance signal Yo. The chrominance signal inverse conversion unit 4 then supplies the output luminance signal Yo and the output chrominance signals Pbo, Pro to a target device (not shown).

The hue calibration parameter dH and the chroma calibration parameter dC are provided as being generated by the calibration parameter generation unit 5, which comprises a hue calculation unit 51 that receives and carries out calculation on the video signal sources R, G, B supplied from the image signal source 1 to obtain a hue value Sh of the video signals R, G, B. Based on the hue value Sh of the video signal sources R, G, B, the hue calibration parameter dH and the chroma calibration parameter dC can be obtained with a hue and chroma mapping look-up table 52.

Figure 2:
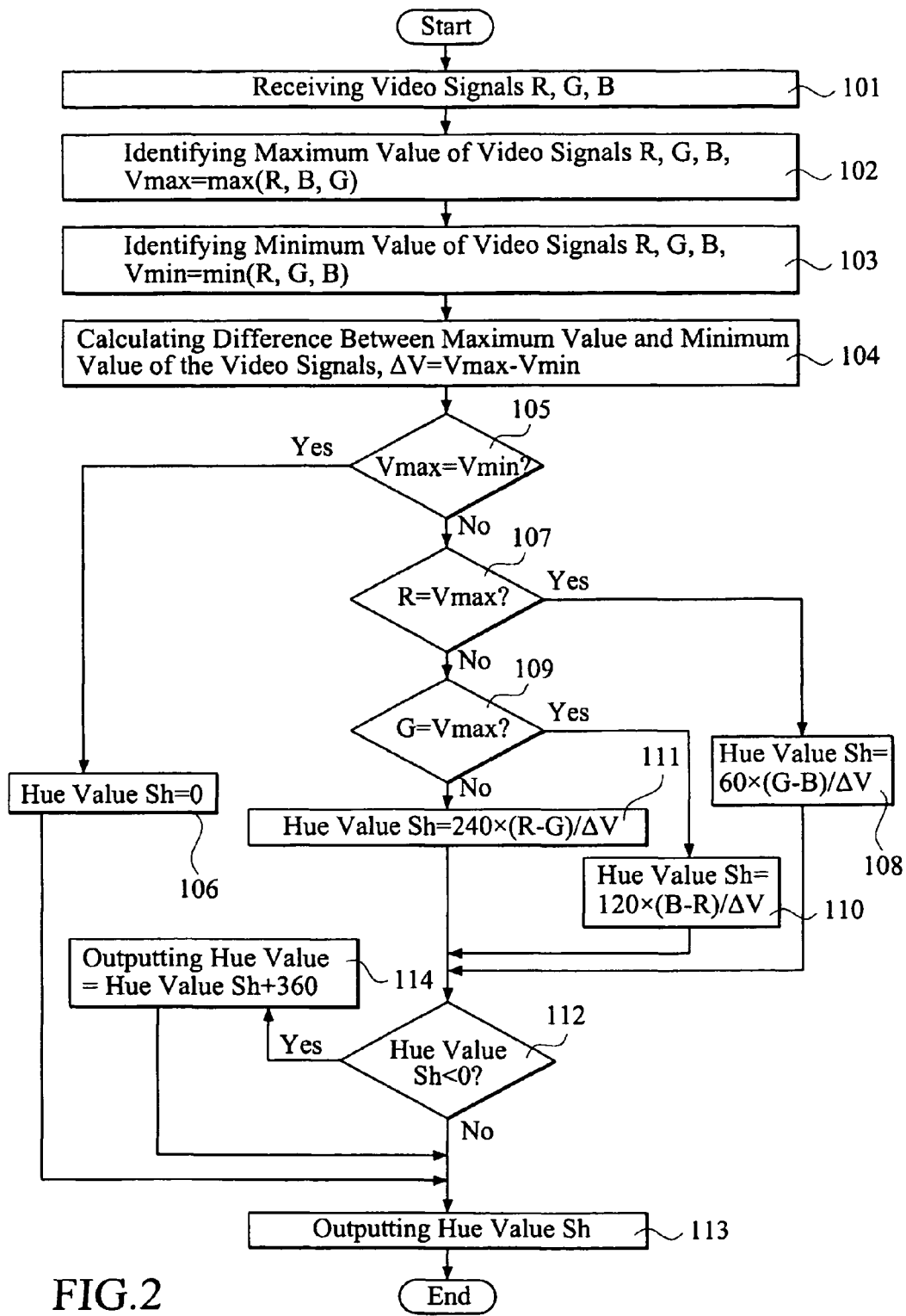
FIG. 2 shows a flow chart for calculating hue value of video signals R, G, B carried out by a hue calculation unit shown in FIG. 1.

FIG. 2 shows a flow chart for calculating the hue value of the video signals R, G, B by the hue calculation unit 51. First of all, the hue calculation unit 51 receives the video signals R, G, B from the image signal source 1 (step 101) and identifies a maximum value of the video signals R, G, B, which is represented as Vmax=max(R, G, B) (step 102) and also identifies a minimum value of the video signals R, G, B as Vmin=min(R, G, B) (step 103). A difference between the maximum value and the minimum value of the video signals is calculated, which is represented as $\Delta V=Vmax-Vmin$ (step 104).

The maximum value and the minimum value are then compared (step 105), and if Vmax is identical to Vmin, then the hue value Sh is set to zero (0) (step 106). If the comparison result is negative in step 105, then it is determined if the video signal R is identical to Vmax (step 107). If the result of step 107 is positive, then the hue value Sh is set to Sh=60×(G−B)/$\Delta V$ (step 108); otherwise it is further determined if the video signal G is identical to Vmax (step 109). If the result of step 109 is positive, then the hue value Sh is set to Sh=120×(B−R)/$\Delta V$ (step 110); otherwise the hue value Sh is set to Sh=240(R−G)/$\Delta V$ (step 111).

After each of steps 108, 110, 111, it is further determined if the calculated hue value Sh is less than zero (step 112) and if the result is negative, then the hue value Sh so calculated in these steps is directly outputted (step 113); otherwise, the hue value is added with 360 (step 114), namely Sh+360, to provide the output hue value.

Figure 3:
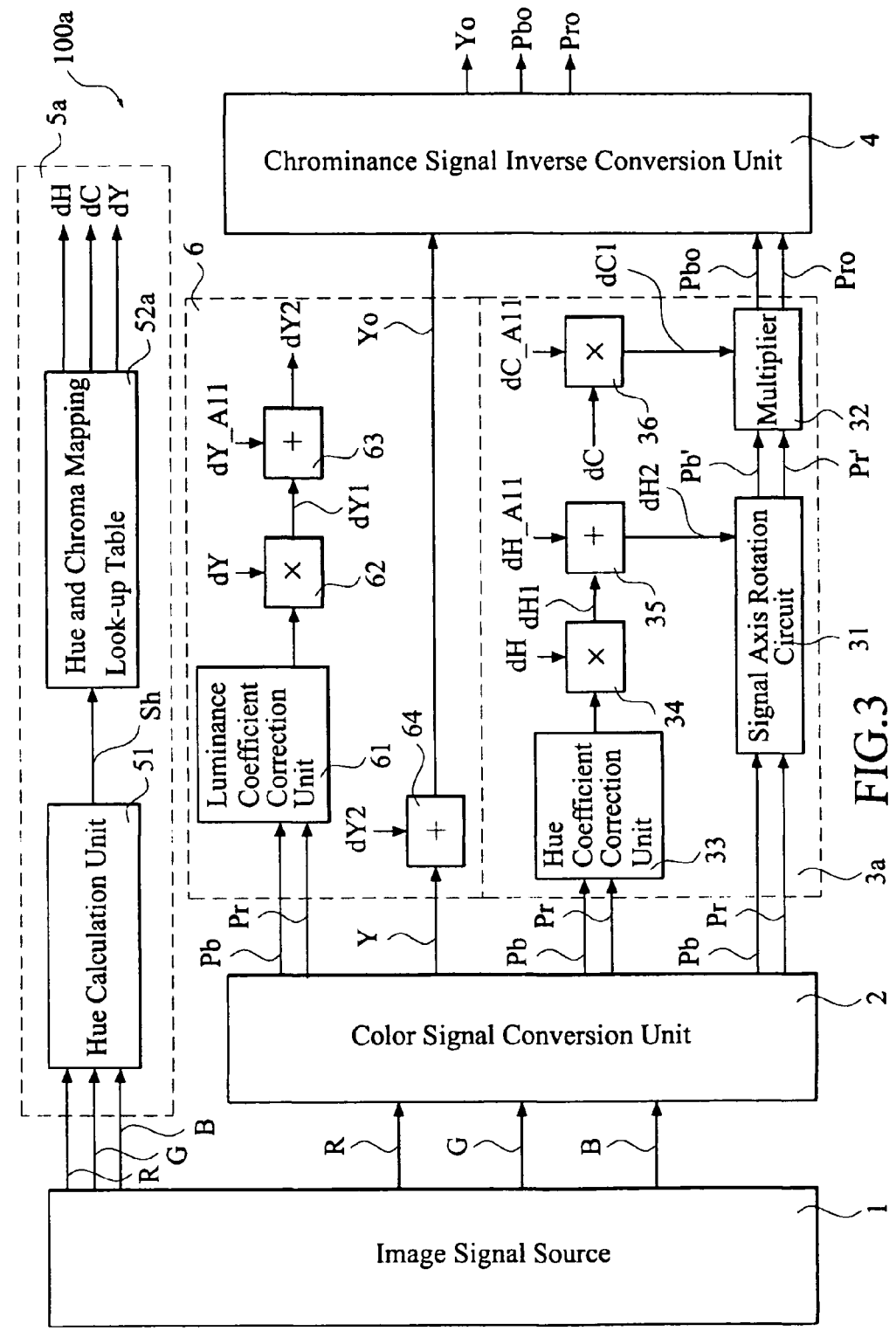
FIG. 3 shows a schematic system diagram for adjusting color image quality in accordance with a second embodiment of the present invention.

FIG. 3 shows a schematic system diagram for adjusting color image quality in accordance with a second embodiment of the present invention, which is constituted in part the same as the color image quality adjusting system 100 shown in FIG. 1 so that the same components/devices/parts will carry identical references for simplicity. The color image quality adjusting system of the second embodiment, generally designated with reference numeral 100a, comprises a color signal conversion unit 2, a hue and chroma conversion and adjustment unit 3a, a chrominance signal inverse conversion unit 4, a calibration parameter generation unit 5a, and a luminance conversion and adjustment unit 6.

Color video signal sources R, G, B supplied from an image signal source 1 are first converted into component video signals Y, Pb, Pr that consist a luminance signal Y and two chrominance signals Pb, Pr. The chrominance signals Pb, Pr are fed to the hue and chroma conversion and adjustment unit 3a for coordination transformation and multiplication to thereby provide output chrominance signals Pbo, Pro.

The calibration parameter generation unit 5a comprises a hue calculation unit 51 and a hue and chroma and brightness mapping look-up table 52a. The video signals R, G, B from the image signal source 1 are processed by the hue calculation unit 51 to obtain a hue value of the video signals R, G, B, based on which a hue calibration parameter dH, a chroma calibration parameter dC, and a luminance calibration parameter dY are obtained through the hue and chroma and brightness mapping look-up table 52a.

The color video signal sources R, G, B supplied from the image signal source 1 are converted into the component video signals Y, Pb, Pr that consist the luminance signal Y and the two chrominance signals Pb, Pr by being processed by the color signal conversion unit 2. And among these component video signals Y, Pb, Pr, the chrominance signals Pb, Pr are applied to the hue and chroma conversion and adjustment unit 3a.

The chrominance signals Pb, Pr are simultaneously sent to a hue coefficient correction unit 33 and then multiplied with the hue calibration parameter dH generated by the calibration parameter generation unit 5a in a multiplier 34 to obtain a corrected hue calibration parameter dH1. The corrected hue calibration parameter dH1 is then added with an all-region hue calibration parameter dH_All in an adder 35 to obtain an overall hue calibration parameter dH2. The all-region hue calibration parameter dH_All is defined as a parameter for simultaneous hue adjustment in all regions.

Further, the chroma calibration parameter dC generated by the calibration parameter generation unit 5a is multiplied with an all-region chroma calibration parameter dC_All in a multiplier 36 to obtain an overall chroma calibration parameter dC1. The all-region chroma calibration parameter dC_All is defined as a parameter for simultaneous chroma adjustment in all regions.

The hue and chroma conversion and adjustment unit 3a also comprises a signal axis rotation circuit 31, which carries out signal coordination transformation based on the overall hue calibration parameter dH2 so obtained and thereafter, multiplication with the overall chroma calibration parameter dC1 is carried out by a multiplier 32 to thereby obtain the output chrominance signals Pbo, Pro.

In the instant embodiment, the luminance conversion and adjustment unit 6 is employed to process the luminance signal Y generated by the color signal conversion unit 2. Firstly, the chrominance signals Pb, Pr are fed to a luminance coefficient correction unit 61 and then multiplied with the luminance calibration parameter dY generated by the calibration parameter generation unit 5a in a multiplier 62 to obtain a corrected luminance calibration parameter dY1. The corrected luminance calibration parameter dY1 is then added with an all-region luminance calibration parameter dY_All in an adder 63 to obtain an overall luminance calibration parameter dY2. The all-region luminance calibration parameter dY_All is defined as a parameter for simultaneous luminance adjustment in all regions.

The luminance signal Y generated by the color signal conversion unit 2 is added with the overall luminance calibration parameter dY2 by an adder 64 to obtain an output luminance Yo that is applied to the chrominance signal inverse conversion unit 4.

Figure 4:
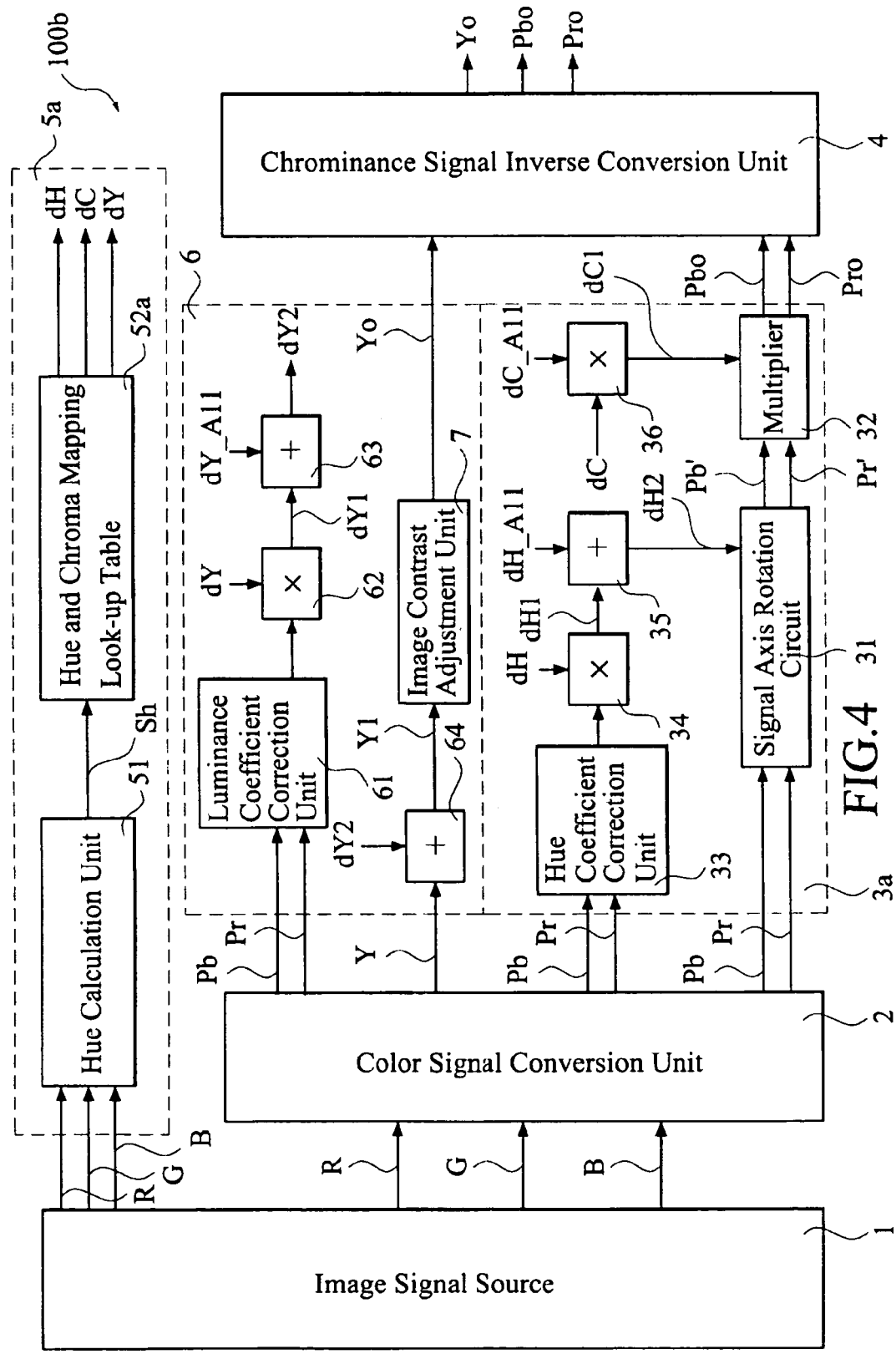
FIG. 4 shows a schematic system diagram for adjusting color image quality in accordance with a third embodiment of the present invention.

FIG. 4 shows a schematic system diagram for adjusting color image quality in accordance with a third embodiment of the present invention, which is constituted in part the same as the color image quality adjusting system 100a shown in FIG. 3 so that the same components/devices/parts will carry identical references for simplicity. The color image quality adjusting system of the third embodiment, generally designated with reference numeral 100b, comprises a color signal conversion unit 2, a hue and chroma conversion and adjustment unit 3a, a chrominance signal inverse conversion unit 4, a calibration parameter generation unit 5a, and a luminance conversion and adjustment unit 6. These components are substantially the same as their counterparts of the embodiment illustrated in FIG. 3 and the connection and operation thereof are similar. The difference between the two embodiments respectively illustrated in FIGS. 3 and 4 is that the luminance conversion and adjustment unit 6 of the embodiment of FIG. 4 comprises an image contrast adjustment unit 7, which carries out adjustment of contrast on the luminance signal Y, after the luminance signal Y is subjected to addition with the overall luminance calibration parameter dY2 by the adder 64, in order to obtain the output luminance signal Yo to be applied to the chrominance signal inverse conversion unit 4.

In view of the above description of the preferred embodiments of the present invention, the color video signal sources R, G, B generated by the image signal source 1 consist of the R, G, and B video signals, while the chrominance signals consist of analog chrominance signals Pb, Pr or digital chrominance signals Cb, Cr or U, V signals or I, Q signals.

Figure 5A:
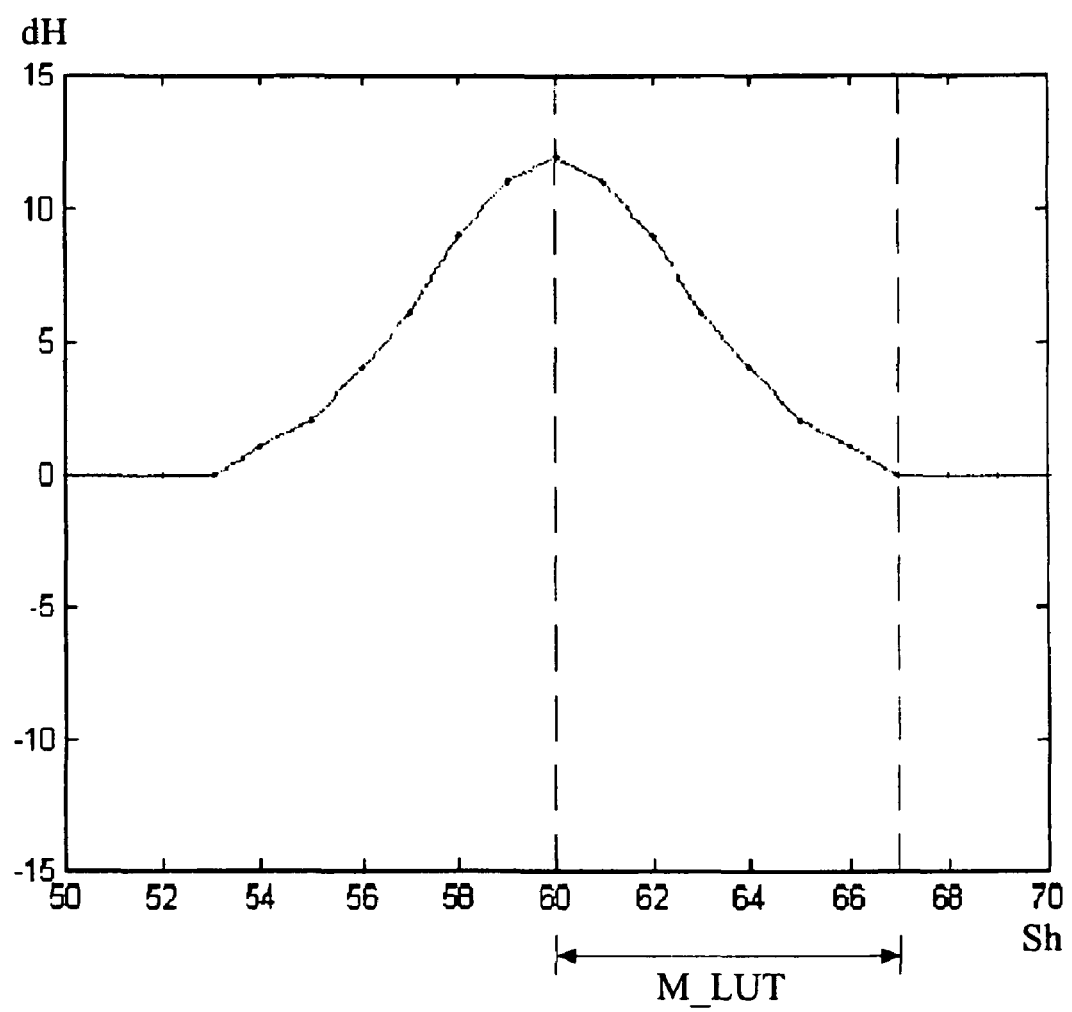
FIGS. 5A and 5B show plots demonstrating mapping relationship between hue value Sh and hue calibration parameter dH in accordance with the present invention.
Figure 5B:
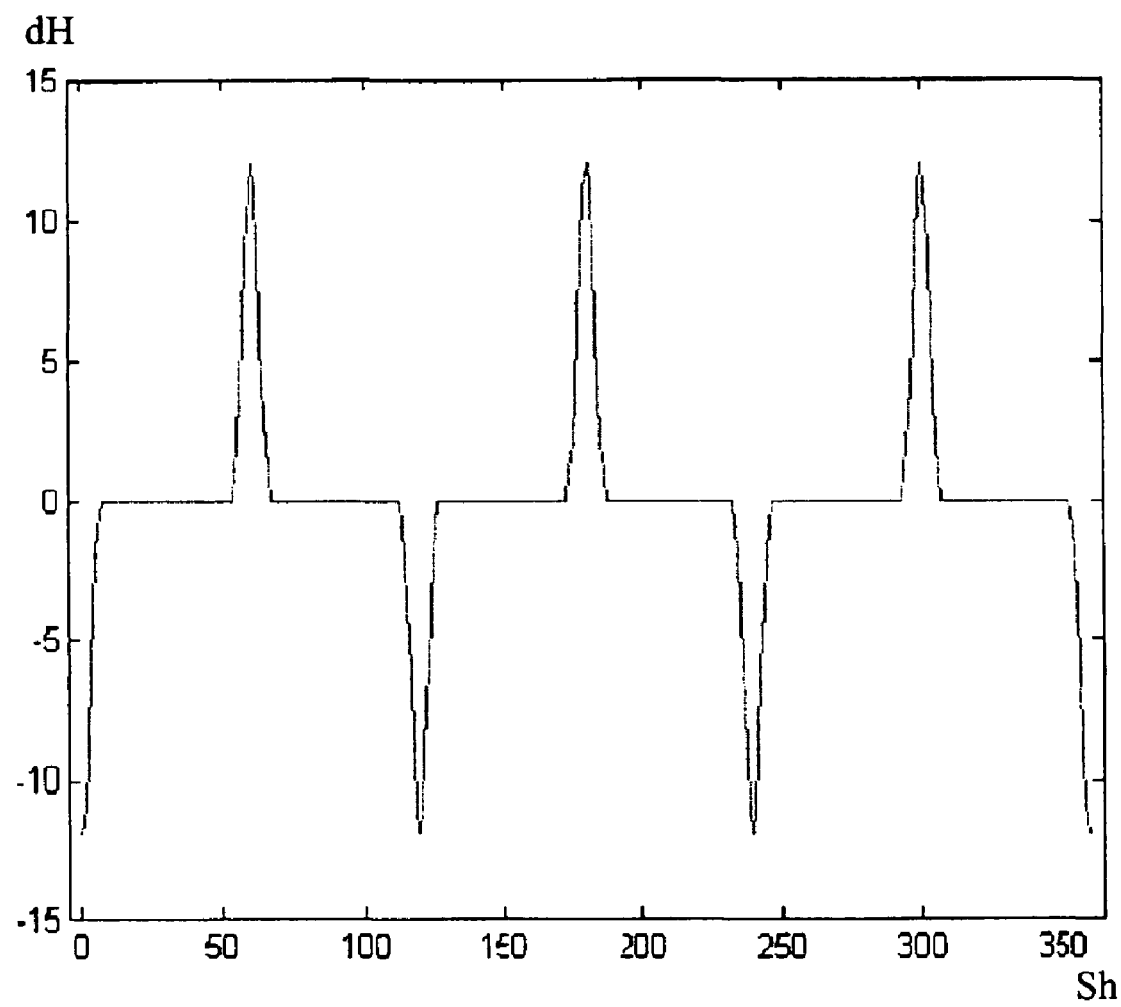

The data of the hue and chroma mapping look-up table 52 of the first embodiment and that of the hue and chroma and brightness mapping look-up table 52a of the second embodiment are arranged in mapping relationship. As shown in FIGS. 5A and 5B, plots demonstrating mapping relationship between hue value Sh and hue calibration parameter dH are given, wherein the abscissa is input of hue value Sh, which is the hue value Sh that a user wishes to adjust and calibrate and is referred to as a calibration point, and the ordinate represents an output of hue calibration parameter dH, which indicates the hue magnitude to be calibrated to by the user, and is referred to as calibrated magnitude.

FIG. 5A shows a mask loop-up table M_LUT, which contains a number of entities of hue calibration parameters dH having the values of [12, 11, 9, 6, 4, 2, 1]. The number and values of the entities contained in the mask look-up table M_LUT can be arbitrarily set by the user. Based on the desired hue magnitude (desired calibrated magnitude) which the user wishes to calibrate to, a real mask look-up table Real_M_LUT can be obtained as follows:

$$\text{Real\_}M\_LUT = M\_LUT \times (\text{desired calibrated magnitude}/M\_\max)$$

wherein M_max=max(M_LUT), indicating the maximum value within the mask look-up table M_LUT.

In the example given above, the first entity of the mask loop-up table M_LUT is the maximum one and corresponds to the point (calibration point) where the user wishes to calibrate to (which has a hue value Sh=60 in the drawing). This calibration point is taken as a mirror mapping center to obtain an identical mirrored half of the mask loop-up table M_LUT, both being combined to form the real mask loop-up table Real_M_LUT. Finally, a number of real mask loop-up tables Real_M_LUT are superimposed to form a final look-up table Final_LUT, which is equal to superimposition of "n" real mask loop-up tables Real_M_LUT as shown in FIG. 5B.

Figure 6A:
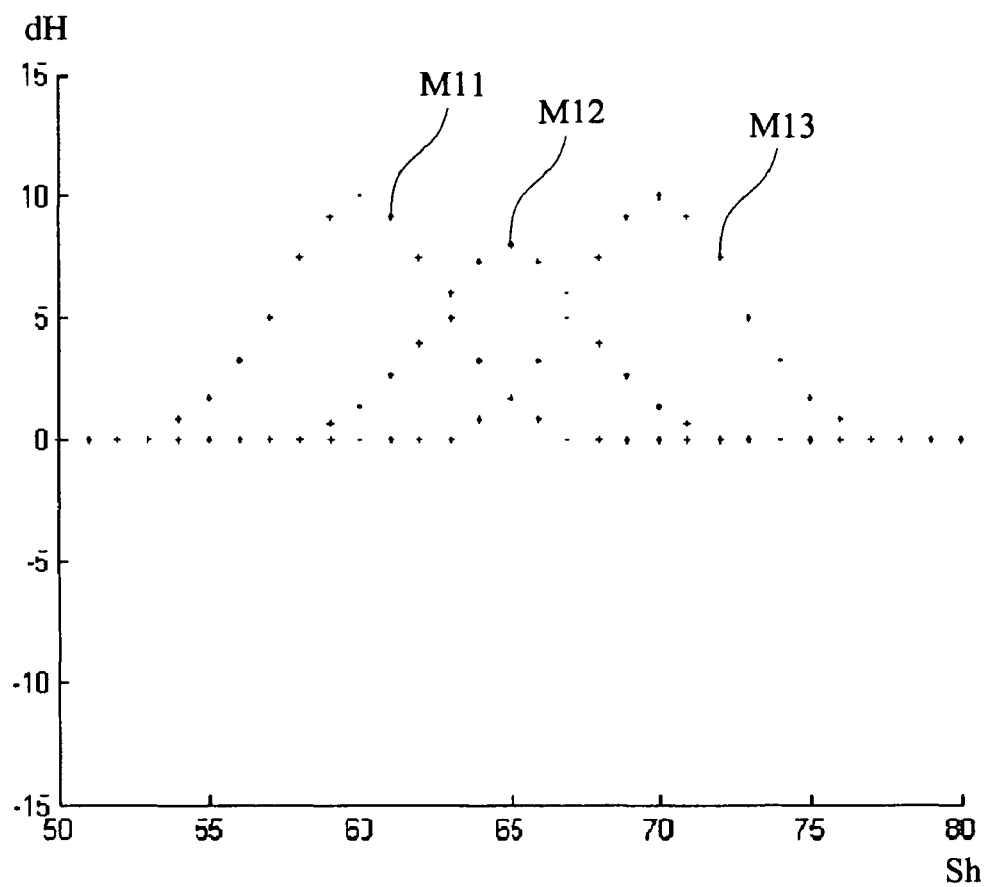
FIGS. 6A and 6B shows superimposition of three real mask loop-up tables to form a final profile of output.
Figure 6B:
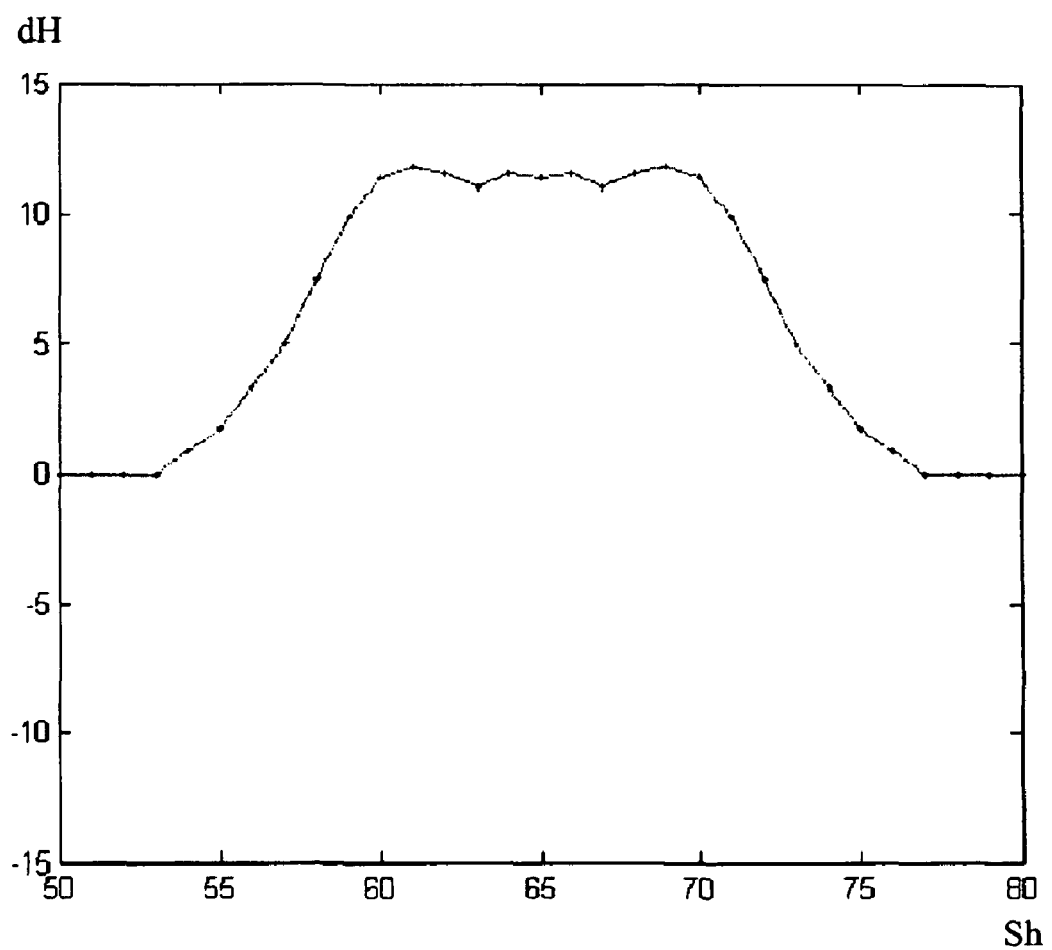

FIGS. 6A and 6B shows an example of superimposition of three real mask loop-up tables to form a final profile of output. In the example, the calibration points of the hue value Sh that the user wishes to calibrate are [60, 65, 70] and the desired calibrated hue magnitudes are [10, 8, 10] respectively. The result of superimposition of the three real mask loop-up tables, which are respectively indicated as M11, M12, M13, is illustrated in FIG. 6B. It is apparent that the number of real mask loop-up tables M_LUT to be superimposed is not subjected to any limitation and usually varies in accordance with the range of calibration for each region. The user may changes the calibration points and the resultant superimposed profiles of the desired calibrated magnitudes.

Figure 7A:
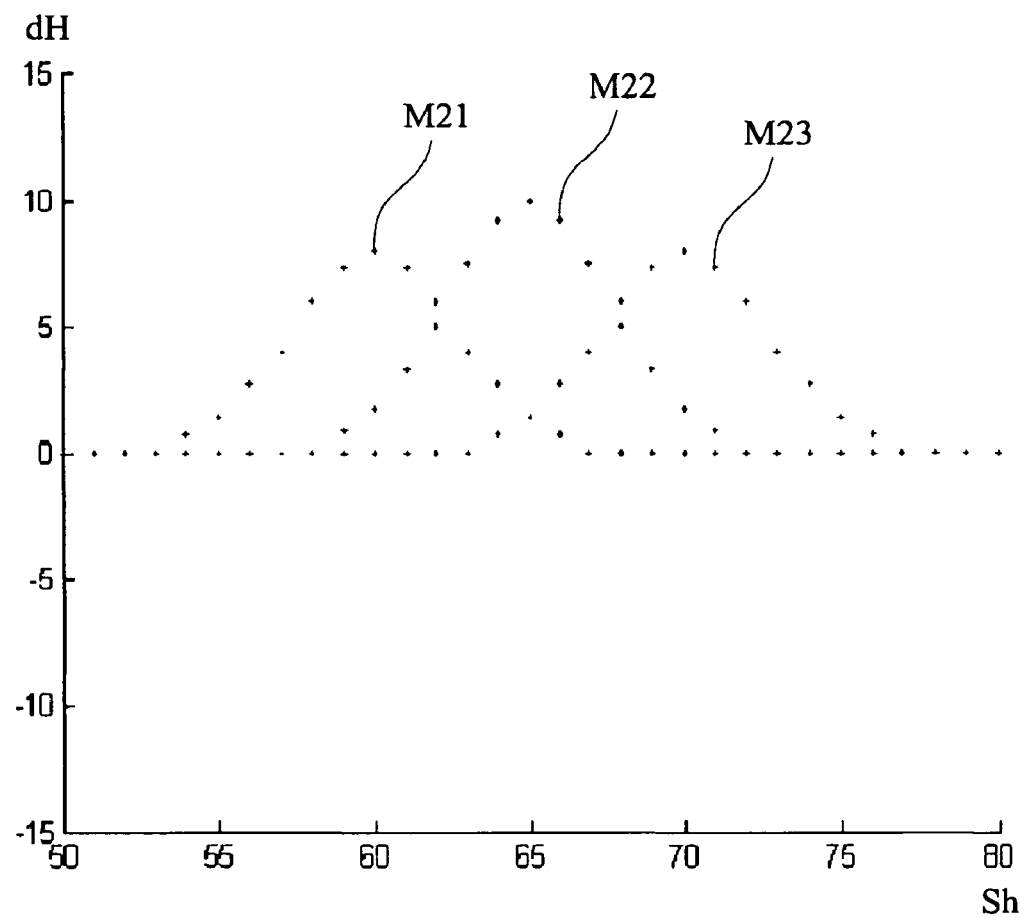
FIGS. 7A and 7B demonstrate another profile obtained from superimposing three real mask loop-up tables.
Figure 7B:
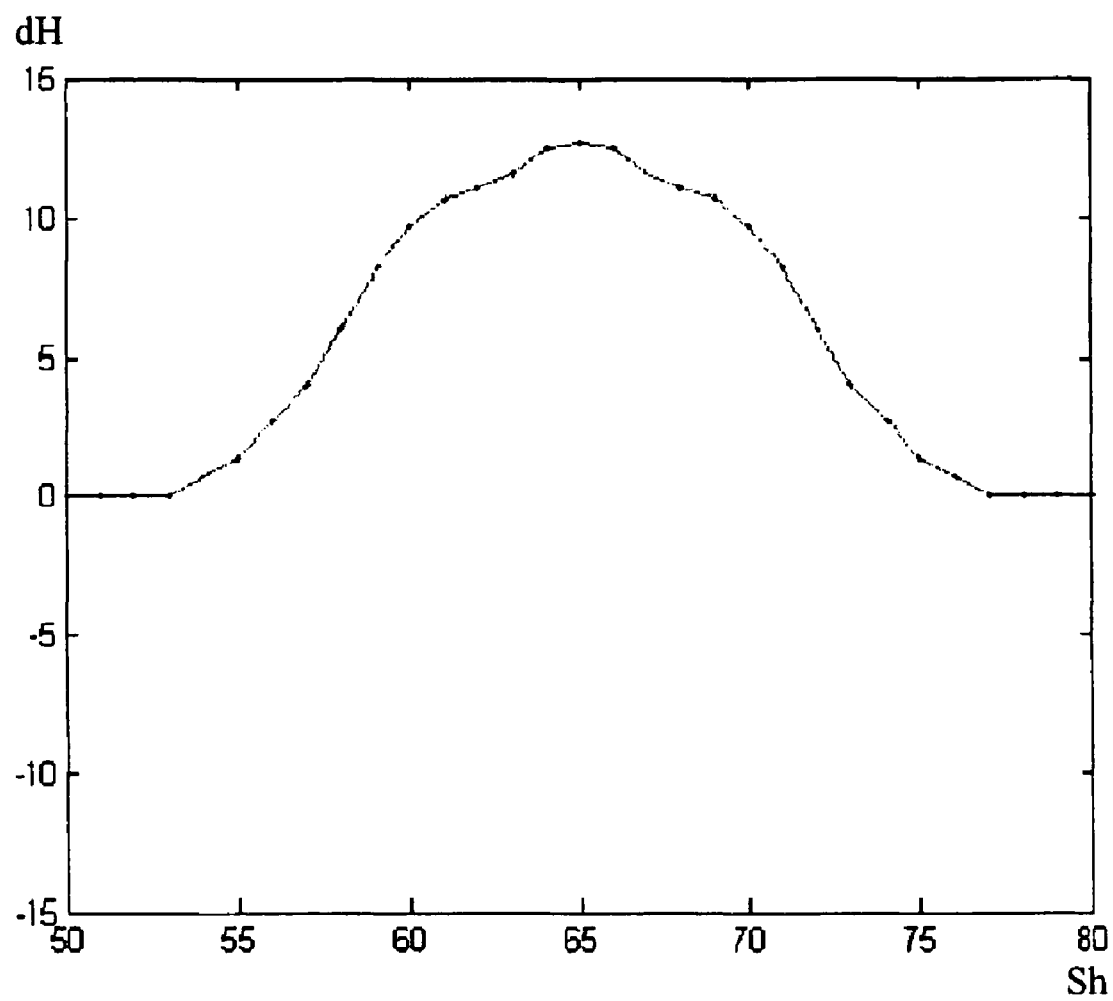

FIGS. 7A and 7B demonstrate another profile obtained from superimposing three real mask loop-up tables. In this example, calibration points for calibrating the hue value Sh are [60, 65, 70] and the desired calibrated magnitudes are [8, 10, 8] respectively. The result of superimposition of the three real mask loop-up tables, respectively indicated as M21, M22, M23, is illustrated in FIG. 7b.

Figure 8A:
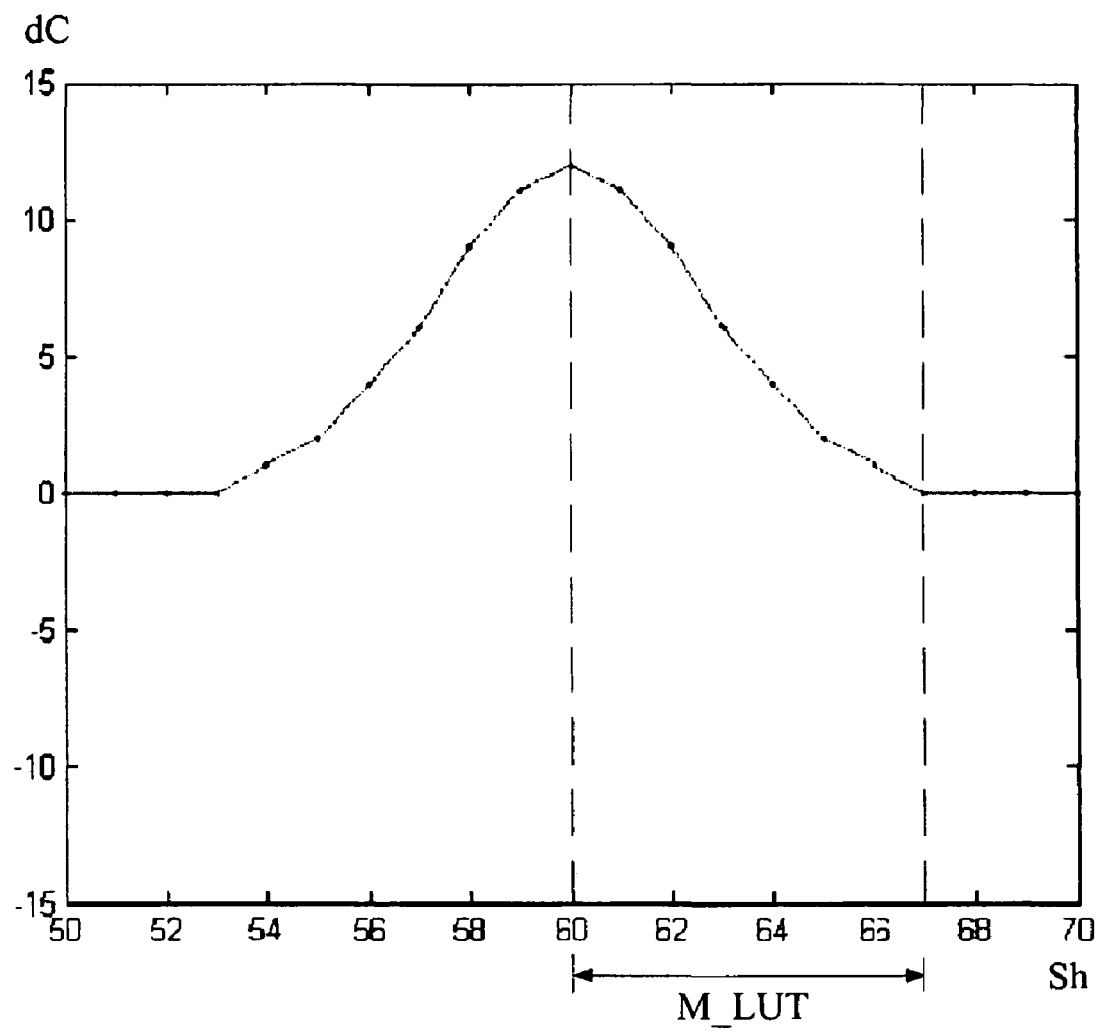
FIGS. 8A and 8B show plots demonstrating mapping relationship between hue value Sh and chroma calibration parameter dC in accordance with the present invention.
Figure 8B:
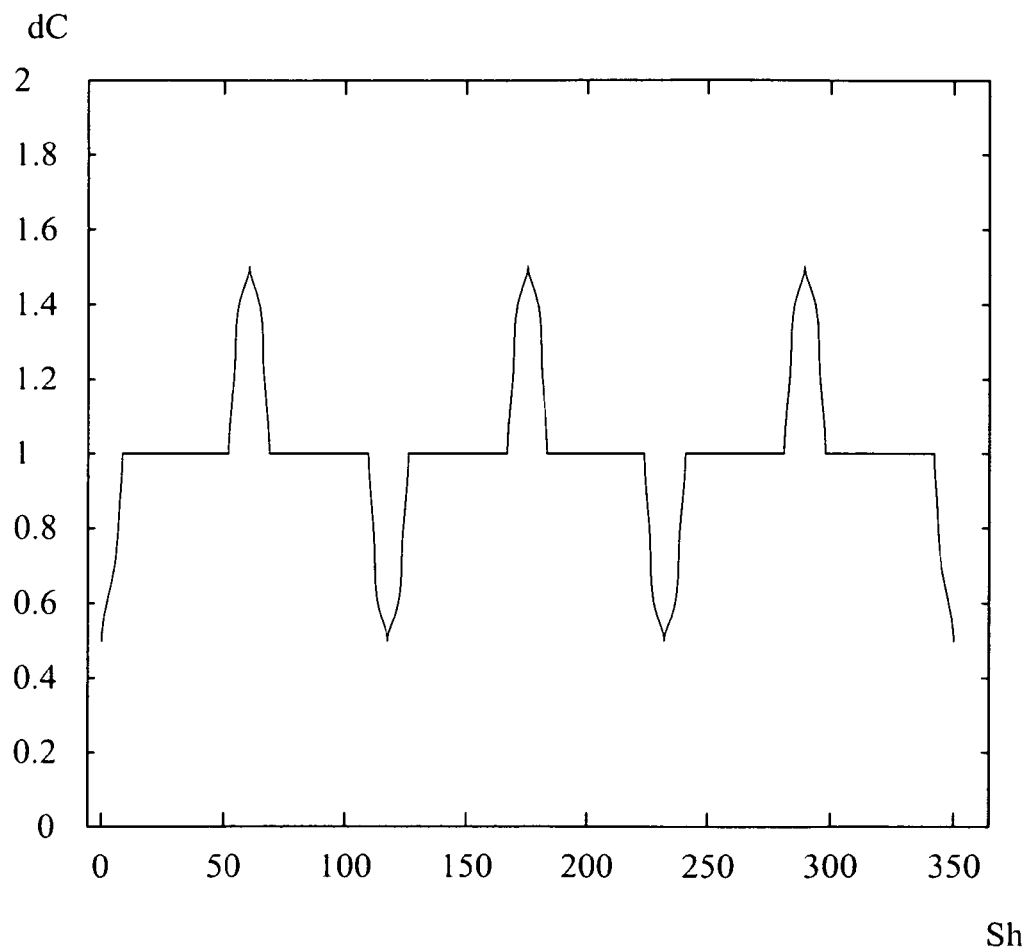

FIGS. 8A and 8B show plots demonstrating mapping relationship between hue value Sh and chroma calibration parameter dC. The abscissa is input of hue value Sh, which is the hue value Sh that a user wishes to adjust and calibrate and is referred to as a calibration point, and the ordinate represents an output of chroma calibration parameter dC, which indicates the chroma magnitude to be calibrated to by the user, and is referred to as calibrated magnitude.

FIG. 8A shows a mask look-up table M_LUT that contains a number of entities of chroma calibration parameters dC having the values of [12, 11, 9, 4, 2, 1]. The number and the values of the entities contained in the mask loop-up table M_LUT can be arbitrarily set by the user. Based on the desired chroma magnitude (desired calibrated magnitude) which the user wishes to calibrate to, a real mask look-up table can be obtained as follows:

Real_$M\_LUT$=(0.5/$M\_$max)×$M\_LUT$×(desired calibrated magnitude/$M\_$max)

wherein M_max=max(M_LUT), indicating the maximum value within the mask look-up table M_LUT.

In the example given above, the first entity of the mask loop-up table M_LUT is the maximum one and corresponds to the point (calibration point) where the user wishes to calibrate to (which has a hue value Sh=60 in the drawing). This calibration point is taken as a mirror mapping center to obtain an identical one of the mask loop-up table M_LUT, both being combined to form the real mask loop-up table Real_M_LUT. Finally, a number of real mask loop-up tables Real_M_LUT are superimposed to form a final look-up table Final_LUT, which is equal to 1+ (superimposition of "n" real mask loop-up tables Real_M_LUT), as shown in FIG. 8B.

FIGS. 9-12 shows the plots indicating the hue coefficient correction unit 33 (also applicable to the luminance coefficient correction unit 6) shown in FIG. 3 carrying out magnitude calibration for hue and luminance in different individual regions. As shown, the individual region hue and luminance calibrated magnitude is corrected in accordance with the chroma data:

(1) Coef_Y_y and Coef_H_y are respectively corrected values of coefficient for Y (luminance) and H (Hue) in the ordinate, having a value between 0 and 1.

(2) The corrected value of coefficient in the abscissa is Coef_x=(Pbx Pb+Prx Pr)^0.5. Coefficient inputs are determined by the setting points P1-Pn in accordance with Coef_x, where n represents the number of the setting points. In the drawings, the number of setting point (n) is at least three and has no upper bond for the maximum number.

Figure 9:
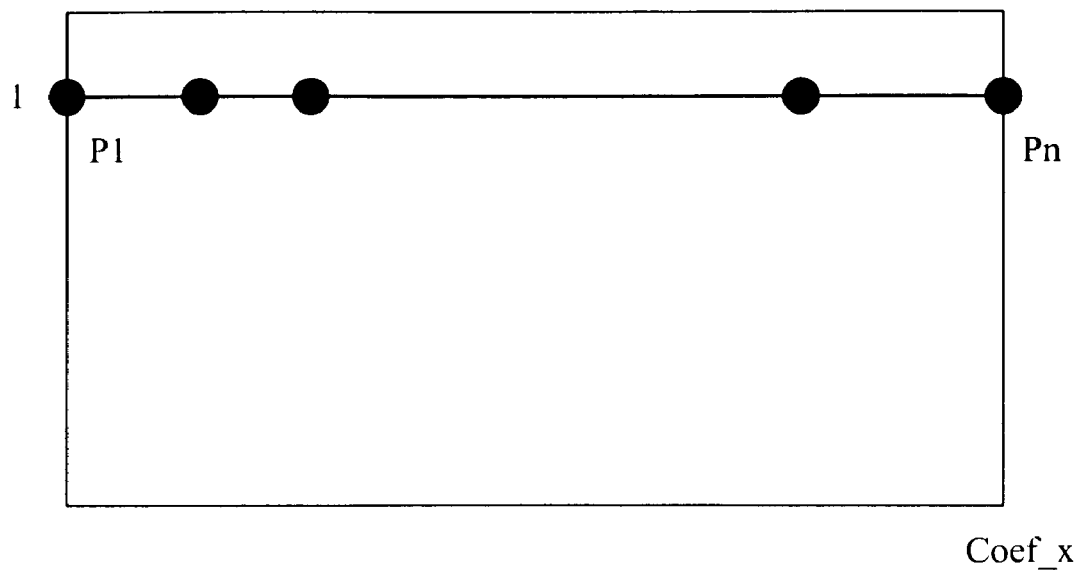
FIGS. 9-12 show plots indicating a hue coefficient correction unit or a luminance coefficient correction unit shown in FIG. 3 carrying out magnitude calibration for hue and luminance in different individual regions.
Figure 10:
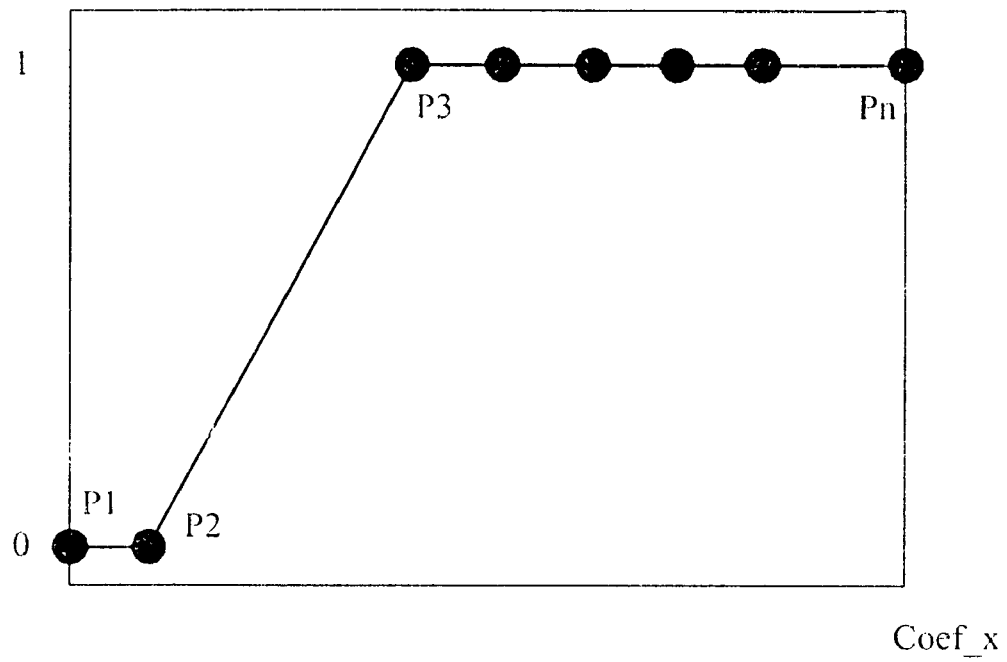
Figure 11:
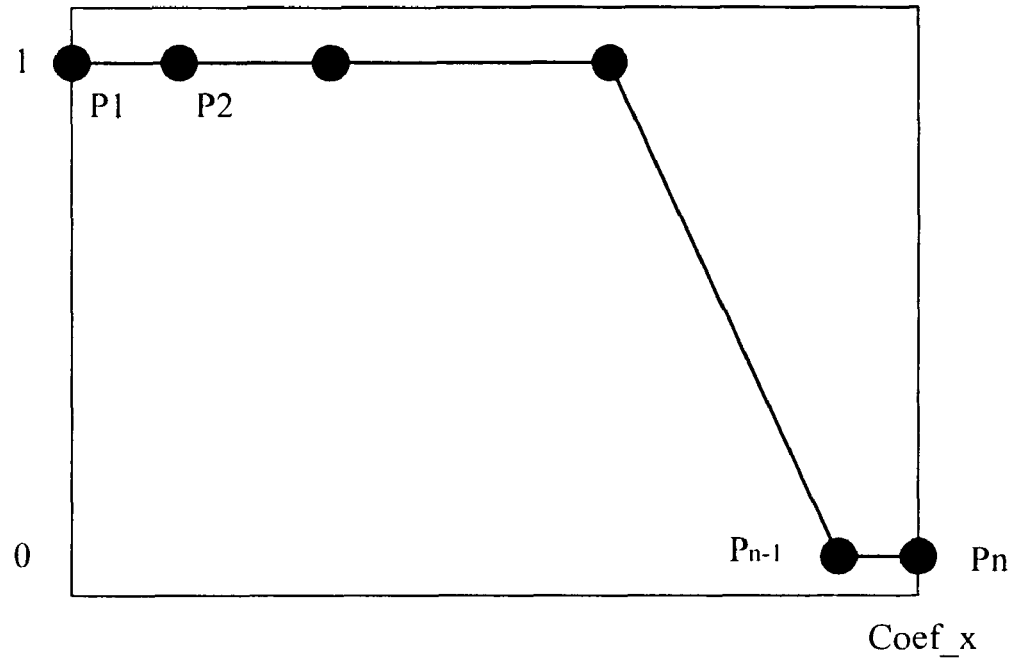
Figure 12:
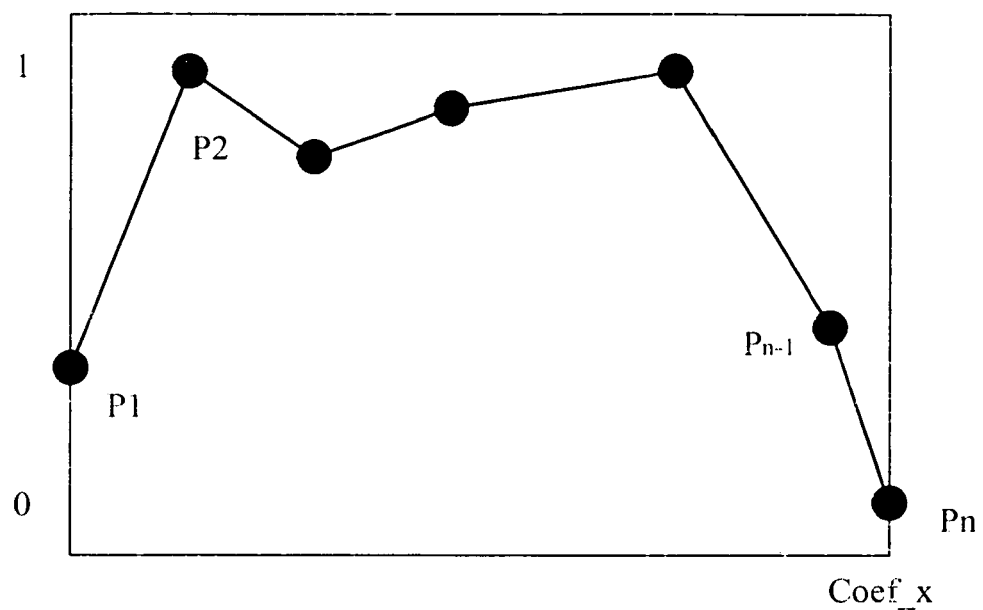

(3) Different Embodiments (3-1) Individual-region calibrated hue and luminance magnitude does not change the desired calibrated magnitude due for different chrominance, as shown in FIG. 9;

(3-2) Individual-region calibrated hue and luminance magnitude only influences medium and high chrominance and in the instant embodiment, the corrected value of the output coefficient is Coef_out=0 and thus the individual-region calibrated hue and luminance magnitude is 0 for low chrominance, as shown in FIG. 10;

(3-3): Individual-region calibrated hue and luminance magnitude only influences medium and low chrominance and in the instant embodiment the corrected value of the output coefficient is Coef_out=0 and thus the individual-region calibrated hue and luminance magnitude is 0 for high chrominance, as shown in FIG. 11; and (3-4) Based on the requirements for calibration, the obtained individual-region calibrated hue and luminance magnitudes can be different for different chrominance positions, as shown in FIG. 12.

Figure 13:
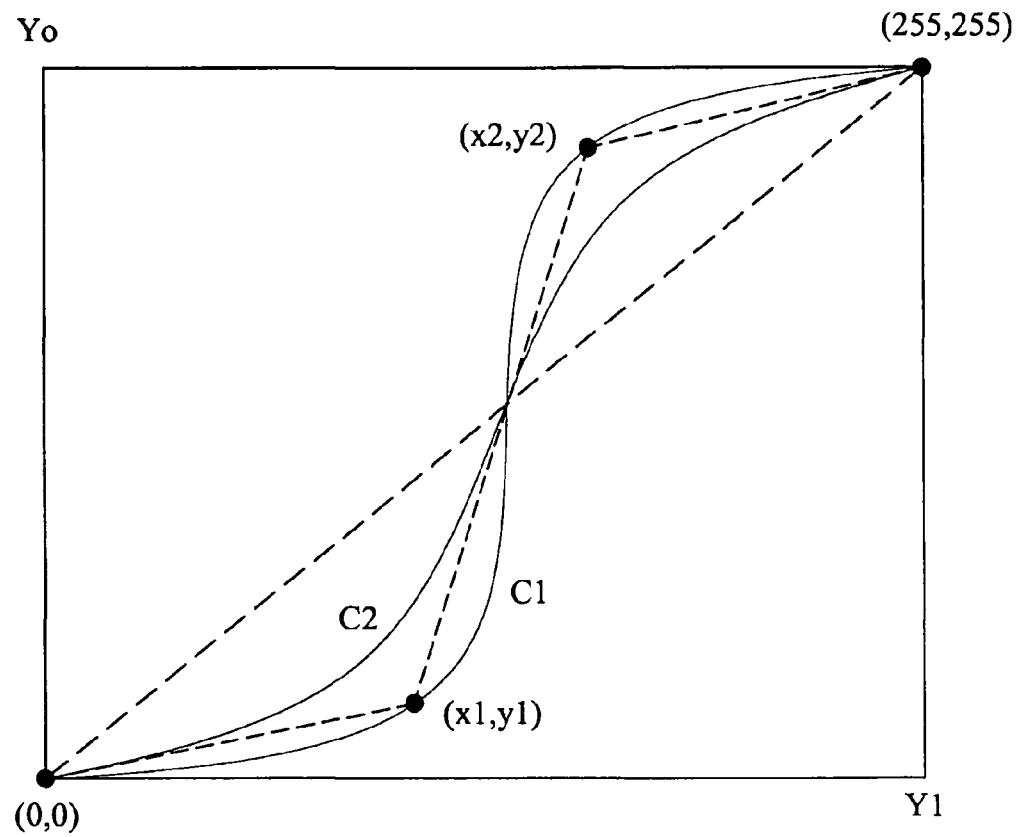
FIGS. 13 and 14 show that the relationship between an input luminance signal and an output luminance signal provided by an image contrast adjustment unit shown in FIG. 4 is an S-shaped curve.
Figure 14:
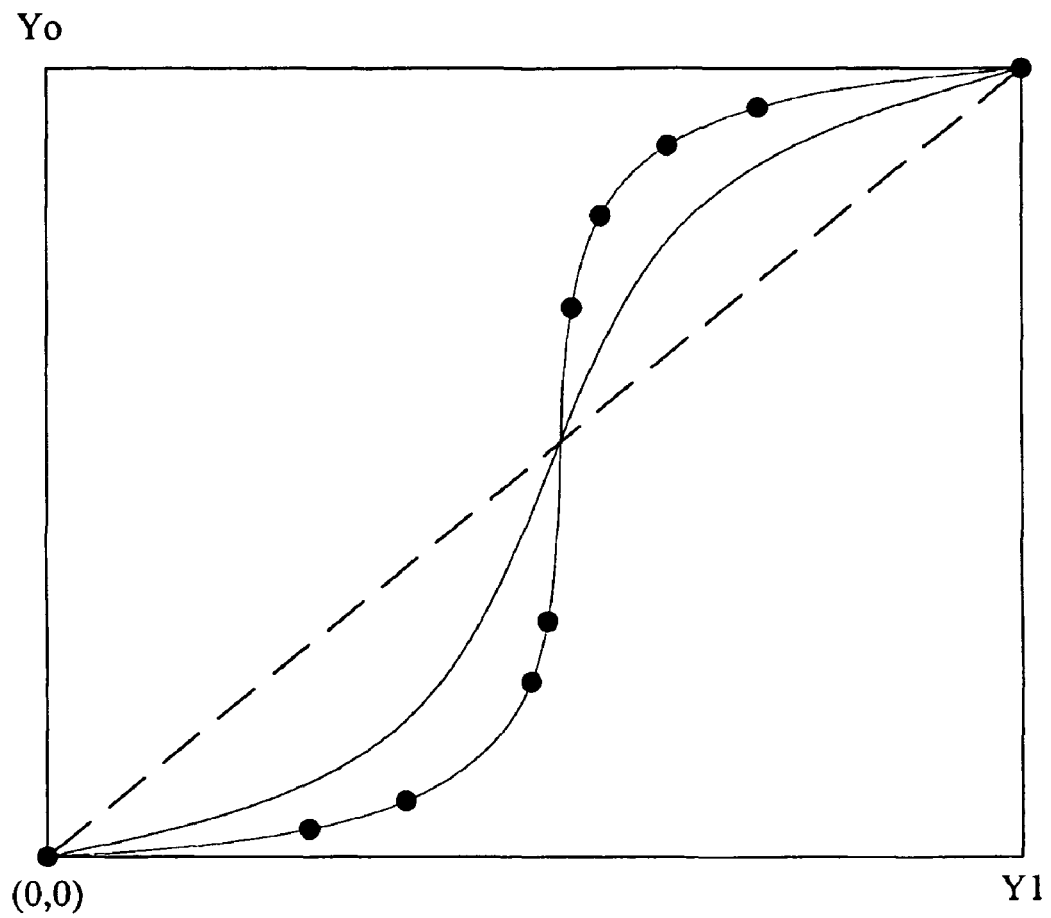

FIGS. 13 and 14 show that the relationship between an input luminance signal Y1 and an output luminance signal Y0 provided by the image contrast adjustment unit 7 of FIG. 4 is an S-shaped curve, which makes a dark region darker and a bright region brighter. The S-shaped curve can be obtained by employing numeral methods or can be composed with multiple points or four points. Taking four points as an example, which are (255, 255), (x1, y1), (x2, y2), and (0, 0), by varying the coordinates of the two points (x1, y1) and (x2, y2), the level of contrast for image can be modified.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A color image quality adjusting system comprising:
  a color signal conversion unit, which receives and converts a color video signal source into component video signals including a luminance signal and chrominance signals;
  a calibration parameter generation unit, which receives and carries out calculation on the color video signal source to obtain a hue value of the color video signal source and bases on the hue value to obtain at least one hue calibration parameter, at least one chroma calibration parameter, and at least one luminance calibration parameter in accordance with a hue and chroma and brightness mapping look-up table;
  a hue and chroma conversion and adjustment unit, which receives the chrominance signals generated by the color signal conversion unit and subsequently subjects the chrominance signals to coordinate transformation in accordance with the hue calibration parameter and signal multiplication operation in accordance with the chroma calibration parameter to generate output chrominance signals; and a luminance conversion and adjustment unit, which receives the chrominance signals generated by the color signal conversion unit and subjects the chrominance signals to addition operation in accordance with the luminance calibration parameter by means of an adder to generate an output luminance signal;

wherein the luminance conversion and adjustment unit comprises a luminance coefficient correction unit, which receives and carries out luminance coefficient correction on the chrominance signals generated by the color signal conversion unit, followed by multiplication with the luminance calibration parameter generated from the calibration parameter generation unit in a multiplier to obtain a corrected luminance calibration parameter, the corrected luminance calibration parameter being then added with an all-region luminance calibration parameter in an adder to obtain an overall luminance calibration parameter, which serves as the luminance calibration parameter for the luminance conversion and adjustment unit for generation of the output luminance signal.

2. The color image quality adjusting system as claimed in claim 1, wherein the color video signal source comprises R, G, B color video signal sources and wherein the chrominance signals comprise analog chrominance signals Pb, Pr or digital color difference signals Cb, Cr or U, V, I, Q signals.

3. The color image quality adjusting system as claimed in claim 1, wherein the hue and chroma conversion and adjustment unit comprises:

a signal axis rotation circuit, which receives the chrominance signals and carries out the coordination transformation on the chrominance signals in accordance with the hue calibration parameter to obtain coordinate-transformed chrominance signals; and a multiplier, which multiplies the coordinate-transformed chrominance signals with the chroma calibration parameter to obtain the output chrominance signals.

4. The color image quality adjusting system as claimed in claim 1, wherein the output luminance signal generated by the luminance conversion and adjustment unit and the output chrominance signals generated by the hue and chroma conversion and adjustment unit together form a component chrominance signal fed out via a chrominance signal inverse conversion unit.

5. The color image quality adjusting system as claimed in claim 1, wherein the chrominance signals are fed to a hue coefficient correction unit and then multiplied with the hue calibration parameter generated by the calibration parameter generation unit in a multiplier to obtain a corrected hue calibration parameter, which is then added with an all-region hue calibration parameter in an adder to obtain an overall hue calibration parameter, the overall hue calibration parameter being applied to the hue and chroma conversion and adjustment unit to serve as the hue calibration parameter for the coordination transformation carried out by the hue and chroma conversion and adjustment unit.

6. The color image quality adjusting system as claimed in claim 1, wherein the chroma calibration parameter generated by the calibration parameter generation unit is multiplied with an all-region chroma calibration parameter in a multiplier to obtain an overall chroma calibration parameter, which is applied to the multiplier of the hue and chroma conversion and adjustment unit to serve as the chroma calibration parameter for the signal multiplication operation carried out by the hue and chroma conversion and adjustment unit.

7. The color image quality adjusting system as claimed in claim 1, wherein the luminance conversion and adjustment unit comprises an image contrast adjustment unit, which subjects the output luminance signal generated by the luminance conversion and adjustment unit to adjustment of image contrast before the output luminance signal is output.

8. A method for adjusting color image quality, comprising the following steps:

(a) receiving and converting a color video signal source into component chrominance signals including a luminance signal and chrominance signals;

(b) carrying out calculation on the received color video signal source to obtain a hue value of the color video signal source;

(c) basing on the calculated hue value to obtain at least one hue calibration parameter and at least one chroma calibration parameter with reference to a hue and chroma mapping look-up table;

(d) carrying out coordination transformation of signal axis rotation in accordance with predetermined coordination transformation formulas on the chrominance signals based on the hue calibration parameter; and (e) carrying out signal multiplication of the transformed chrominance signals with the chroma calibration parameter to obtain an output chrominance signal;

wherein the hue and chroma mapping look-up table is obtained with the following steps:

defining a mask look-up table M_LUT in the hue and chroma mapping look-up table;

basing on a hue calibration point and a desired hue calibrated magnitude set by a user to obtain a real mask look-up table Real_M_LUT=M_LUT×(the desired hue calibrated magnitude/M_max), where M_max=max (M_LUT), indicating a maximum value of the mask look-up table M_LUT;

setting a first entity of the mask look-up table M_LUT to the maximum value corresponding to the hue calibration point set by the user, which serves as a mirror mapping center to obtain an identical mirrored half of the mask look-up table; and superimposing a number of real mask look-up tables Real_M_LUT to obtain a final look-up table that serves as the hue and chroma mapping look-up table.

9. The method as claimed in claim 8, wherein in step (a), the color video signal source comprises R, G, B color video signal sources and the chrominance signals comprise analog chrominance signals Pb, Pr or digital color difference signals Cb, Cr or U, V, I, Q signals.

10. The method as claimed in claim 8, wherein in step (d), the predetermined coordination transformation formulas include:

$$Pb'=(Pb \times \mathrm{Cos}(dH\_\theta)-Pr \times \mathrm{Sin}(dH\_\theta))$$

$$Pr'=(Pr \times \mathrm{Cos}(dH\_\theta)+Pb \times \mathrm{Sin}(dH\_\theta))$$

where Pb', Pr' are transformed chrominance signals, Pb, Pr are the originally input chrominance signals and dH_θ indicates the angle θ of the hue calibration parameter dH on the PbPr coordinate plane.

11. The method as claimed in claim 8, wherein step (f) further comprises a step of basing on the calculated hue value to obtain a luminance calibration parameter with reference to a hue and chroma and brightness mapping look-up table.

12. The method as claimed in claim 11 further comprising a step of subjecting the chrominance signals to addition operation in accordance with the luminance calibration parameter by means of an adder to generate an output luminance signal.

* * * * *